United States Patent [19]

Klempner et al.

[11] Patent Number: 4,775,404

[45] Date of Patent: Oct. 4, 1988

[54] APPARATUS FOR REGISTERING GLASS SHEET ON GLASS SHEET SHAPING TOOL

[75] Inventors: James M. Klempner, Blissfield, Mich.; Jack W. Adoline, Toledo, Ohio

[73] Assignee: Glasstech, Inc., Perrysburg, Ohio

[21] Appl. No.: 121,480

[22] Filed: Nov. 17, 1987

[51] Int. Cl.$^4$ .............................................. C03B 23/023
[52] U.S. Cl. ........................................ 65/273; 65/289; 65/106; 65/107
[58] Field of Search ................... 65/289, 273, 106, 107

[56] References Cited

U.S. PATENT DOCUMENTS

| | | | |
|---|---|---|---|
| 2,729,032 | 1/1956 | White | 65/289 |
| 3,162,523 | 12/1964 | McKelvey et al. | 65/289 |
| 4,437,872 | 3/1984 | McMaster et al. | 65/273 X |
| 4,475,937 | 10/1984 | Nitschke | 65/273 X |

*Primary Examiner*—Arthur Kellogg
*Attorney, Agent, or Firm*—Brooks & Kushman

[57] ABSTRACT

An apparatus (10) for registering a glass sheet (12) on a mold (24) is disclosed as including a plurality of glass sheet locators (26) movably mounted on the mold. Each locator (26) includes a connector (28) pivotal in a horizontal plane about a pivotal axis (A) extending vertically from the mold. Each connector (28) also is vertically moveable along its pivotal axis (A) between a raised position above the mold (24) for locating the glass sheet (12) as the glass sheet moves along a topside transfer platen (14) and a lowered position below a curved mold surface (25). Linkages (30) connect the locators (26) for cooperable operation to position the glass sheet (12) with respect to the mold (24). An actuator (32) moves the linkages (30) to raise the locators (26) above the mold to locate the glass sheet (12) on the topside transfer platen (14) with the cooperable operation of a back gate (22). The actuator (32) also operates pivotal movement of the connectors (28) to position the glass sheet (12) for subsequent registration with the curved mold surface (25).

10 Claims, 5 Drawing Sheets

1

APPARATUS FOR REGISTERING GLASS SHEET ON GLASS SHEET SHAPING TOOL

TECHNICAL FIELD

This invention relates to an apparatus for registering glass sheets on a glass sheet shaping tool which has particular utility when used in connection with glass sheet forming systems using a topside transfer platen.

BACKGROUND ART

In a conventional glass sheet handling system including a roller conveyor, a glass sheet is received by a topside transfer platen which includes a downwardly facing surface for receiving a glass sheet prior to release onto a glass sheet shaping tool such as a ring mold used for forming the glass sheet. The glass sheet is supported on the topside transfer platen by vacuum pressure on the topside transfer platen prior to being deposited onto the mold. Pressurized gas is used to prevent surface to surface contact and to assist in conveying the glass sheet. Inertia of the glass sheet moving on the roller conveyer provides movement of the glass sheet supported on the topside transfer platen into engagement with a suitable mechanical stop mounted on the topside transfer platen. The pressurized gas stream can be inclined to assist the inertia in conveying the glass sheet to engagement with the mechanical stop. A back gate assembly is moved into position at the upstream end of the glass sheet to prevent it from bouncing off the mechanical stop. With the glass sheet so positioned, the vacuum drawn by the transfer platen is terminated and the glass sheet is deposited on the ring mold below the topside transfer platen. This alignment process results in less than accurate registration of the glass sheet on the forming mold.

In another glass processing system utilizing the topside transfer platen, the ring mold has vertically movable glass sheet locators mounted thereon. These locators can be raised to catch the glass sheet as it moves along the topside transfer platen and subsequently lowered simultaneously with the termination of vacuum to position the glass sheet on the mold for forming. Molds having these glass sheet locators have notches cut into the mold surface for placing of the locators to provide the most accurate placement of the glass sheet on the mold. These notches however reduce the strength of the mold and frequently chip edges of the glass sheet formed on these molds.

DISCLOSURE OF THE INVENTION

An object of the present invention to provide an improved platen for providing accurate registration of a glass sheet on a mold surface. In carrying out this object, the platen includes a heating conveyer for conveying a glass sheet for forming, a topside transfer platen that receives the heated glass sheet from the heating conveyer and provides support thereof from above without surface to surface contact and a mold that is reciprocally positionable below the topside transfer platen to receive the heated glass sheet from the topside transfer platen. The apparatus is used to accurately register the heated glass sheet supported by the topside transfer platen onto the mold positioned below the topside transfer platen.

The registering apparatus of the invention includes a plurality of glass sheet locators, each including a mount, movably mounted on the mold. Each locator includes a connector pivotal in a horizontal plane about a pivotal axis extending vertically from the mold. Also each connector is vertically moveable along the pivotal access between a raised position above the mold for locating the glass sheet as the glass sheet moves along the topside transfer platen and a lowered position below the curved mold surface. Linkages connect the locators for cooperable operation to position the glass sheet with respect to the mold. An actuator moves the linkages to raise the locators above the mold to locate the glass sheet on the topside transfer platen. The linkages are also operable, with the cooperable operation of a backgate, to operate pivotal movement of the connectors, to position the glass sheet for subsequent registration with the curved mold surface whereby the glass sheet can be accurately deposited on the mold by the topside transfer platen in preparation for subsequent forming.

In the preferred embodiment of the invention the linkages include elongated bars for vertical actuation of the locators and also elongated rods for pivotal movement of the locators. A drive shaft actuates the elongated bars to effect the vertical movement of the locators and a driving member actuates the elongated rods to effect the pivotal movement of the locators. Also, each locator includes a counterweight mounted thereon that is cooperable with the elongated bars to compensate for any over travel of the elongated bars and for limiting vertical movement of the locators.

Preferably, the registering apparatus includes a glass engagement element mounted on the connector for engaging the glass sheet. Preferably the glass engagement element is rotatably mounted on the connector. Most preferably the glass engagement element is a rotatable disk.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
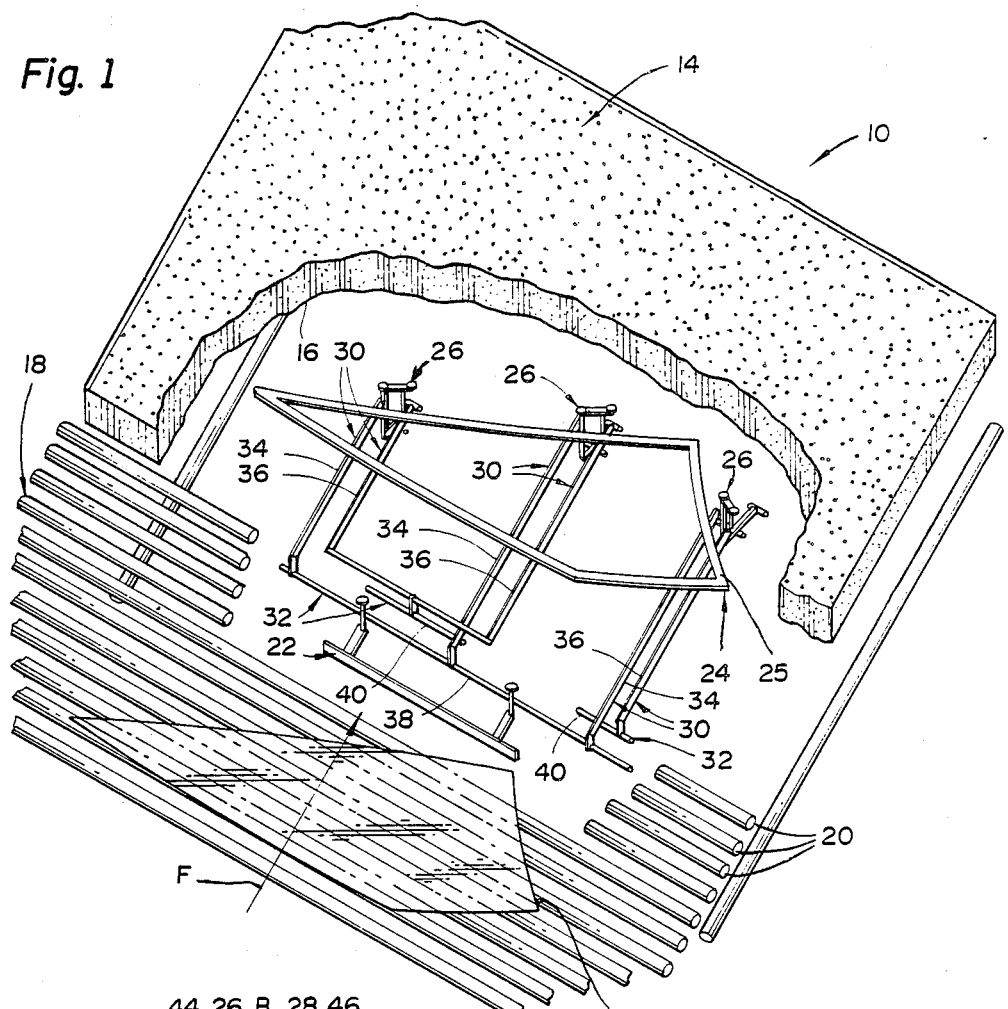
FIG. 1 is a perspective view of a glass sheet forming system including a topside transfer platen and conveyer rolls adjacent the transfer platen both shown partially broken away to illustrate an apparatus for subsequently registering the glass sheet on a glass sheet shaping tool, the apparatus being constructed in accordance with the present invention.

Referring to FIG. 1 of the drawings, an apparatus constructed in accordance with the present invention is generally indicated by reference numeral 10 and is used for registering a glass sheet 12 on a glass sheet shaping tool. As is hereinafter more fully described, the apparatus 10 provides accurate registration when used in conjunction with a topside transfer platen 14 and a mold 24 located below the topside transfer platen. The mold 24 referred to hereinafter is a perimeter female mold which cooperates with a full surface male mold, not shown, for subsequent bending of the glass sheet 12.

FIG. 1 illustrates a glass sheet forming system including a topside transfer platen 14 having a downwardly facing surface 16 located adjacent to and extending away from a heating conveyor 18. The heating conveyor includes conveyor rolls 20 and also a glass positioning backgate 22. The transfer platen 14 is at an elevation just slightly above the conveyor rolls 20 to receive a heated glass sheet 12 from the heating conveyor 18. The glass sheet 12 is supported on the topside transfer platen 14 by vacuum pressure. The topside transfer platen is located above a moveable mold 24 shown here as a perimeter female mold having a curved mold surface 25. The mold 24 is reciprocally positional below the topside transfer platen 14 to receive the heated glass sheet 12 from the topside transfer platen after the glass sheet has been accurately located on the transfer platen above the mold.

With further reference to FIG. 1, the improvement comprises a plurality of glass sheet locators 26, each locator including a mount 28, movably mounted on the mold 24. Each locator 26 includes a connector 28 pivotal in a horizontal plane about a pivotal axis A extending vertically from the mold 24. Each connector 28 is also vertically moveable along its pivotal axis A between a raised position, located above the mold 24 for locating the glass sheet 12 as the glass sheet moves along the topside transfer platen 14, and a lowered position below the curved mold surface 25. Linkages 30 connect the locators 26 for cooperable operation to reposition the glass sheet 12 with respect to the mold 24. An actuator 32 moves the linkages to raise the locators 26 above the mold 24 to locate the glass sheet 12 on the topside transfer platen 14. Actuator 32 also operates with the cooperable operation of the backgate 22 and operates pivotal movement of the connectors 28 to position the glass sheet 12 for subsequent registration with the curved mold surface 25 whereby the glass sheet 12 can be accurately deposited on mold 24 by the topside transfer platen 14 in preparation for the subsequent forming operation.

As illustrated in FIGS. 1, 4, 5, 6 and 7, linkages 30 include elongated bars 34 for vertical actuation of the locators 26. Linkages 30 also include elongated rods 36 for actuating pivotal movement of the locators 26. A drive shaft 38 actuates the elongated bars 34 to effect the vertical movement of the locators 26 and a driving member 40 actuates the elongated rods 36 to effect pivotal movement of the locators. Each glass sheet locator 26 is shown as including a counterweight 42 mounted thereon. The counterweights 42 are cooperably attached to the elongated bars 34. The counterweights 42 compensate for any over travel movement of the elongated bars 34 to limit vertical movement of the locators 26 so that the topside transfer platen 14 cannot be contacted by the locators and thereby damaged.

As shown in FIGS. 1 through 7 a glass engagement element 44 is mounted on the connector 28 for engaging the glass sheet 12. Preferably the glass engagement element 44 is rotatably mounted on the connector and is most preferably formed as a disk 46. The rotatable disc 46 rotates about the perimeter of the glass sheet 12 as the connector 28 is pivoted to locate the glass sheet on the topside transfer platen 14 above the mold 24.

Operation of the apparatus 10 is best seen by following the progress of glass sheet 12 through FIGS. 1, 4, 5, 6 and 7 consecutively. In FIG. 1 glass sheet 12 is shown exiting the heating conveyor 18 along conveyor rolls 20 in the direction of glass flow F shown. Momentum of the glass sheet 12 on the conveyor rolls 20 causes the glass sheet to move along the topside transfer platen 14 as the glass sheet is supported by vacuum pressure from the topside transfer platen. The moveable mold 24 is shown positioned below the topside transfer platen 14 to subsequently receive the heated glass sheet 12. The three glass sheet locators 26 are shown in a raised position raised by actuation of drive shaft 38 and subsequent movement of elongated bars 34. All three locators 26 will be sequentially operated to locate the glass sheet 12 as it moves along the topside transfer platen 14.

Figure 4:
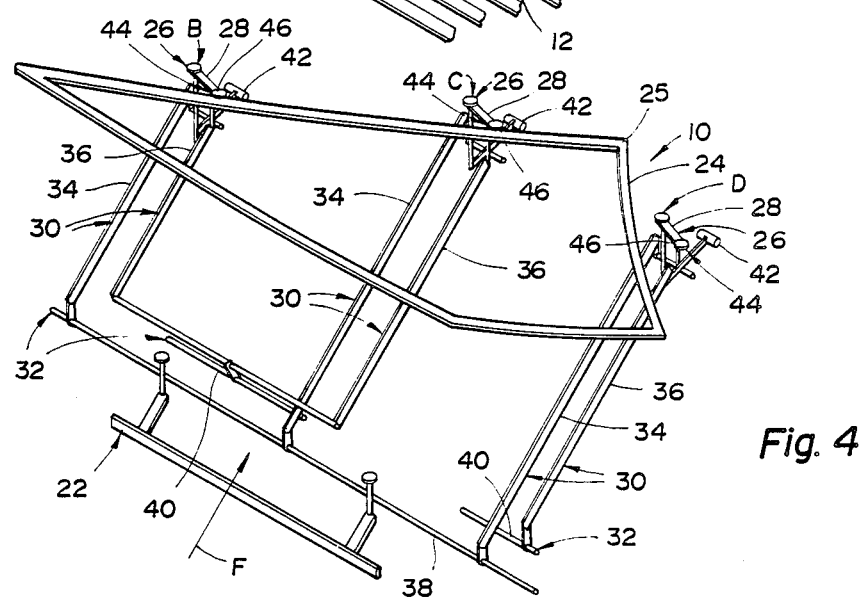
FIG. 4 is an enlarged perspective view of the registering apparatus shown in FIG. 1 illustrating a backgate and the glass sheet shaping tool as being a perimeter female mold and the glass sheet locator contacting the mold in a position for receiving the heated glass sheet.
Figure 2:
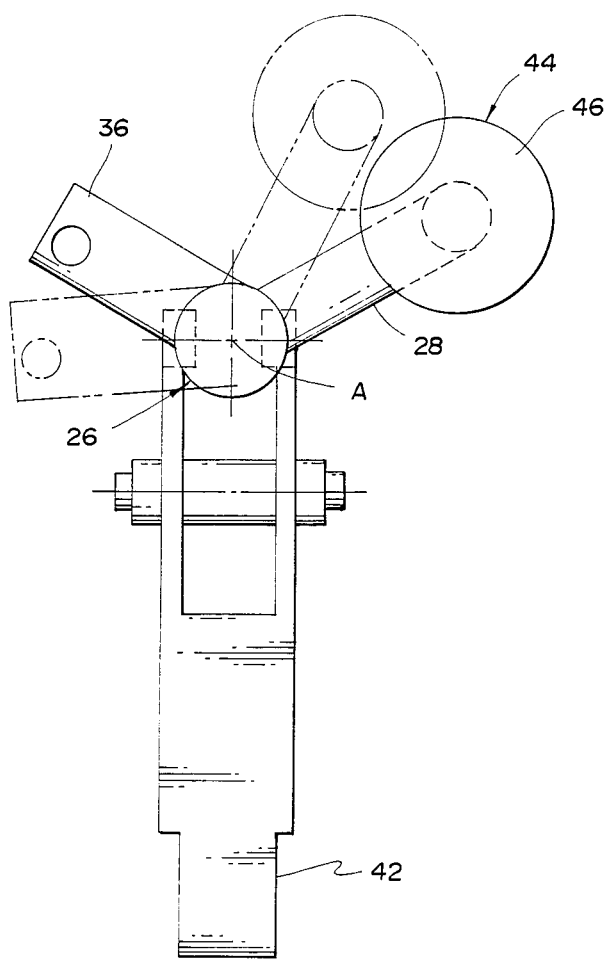
FIG. 2 is a plan view of a glass sheet locator illustrating a connector and glass engaging disc.
Figure 3:
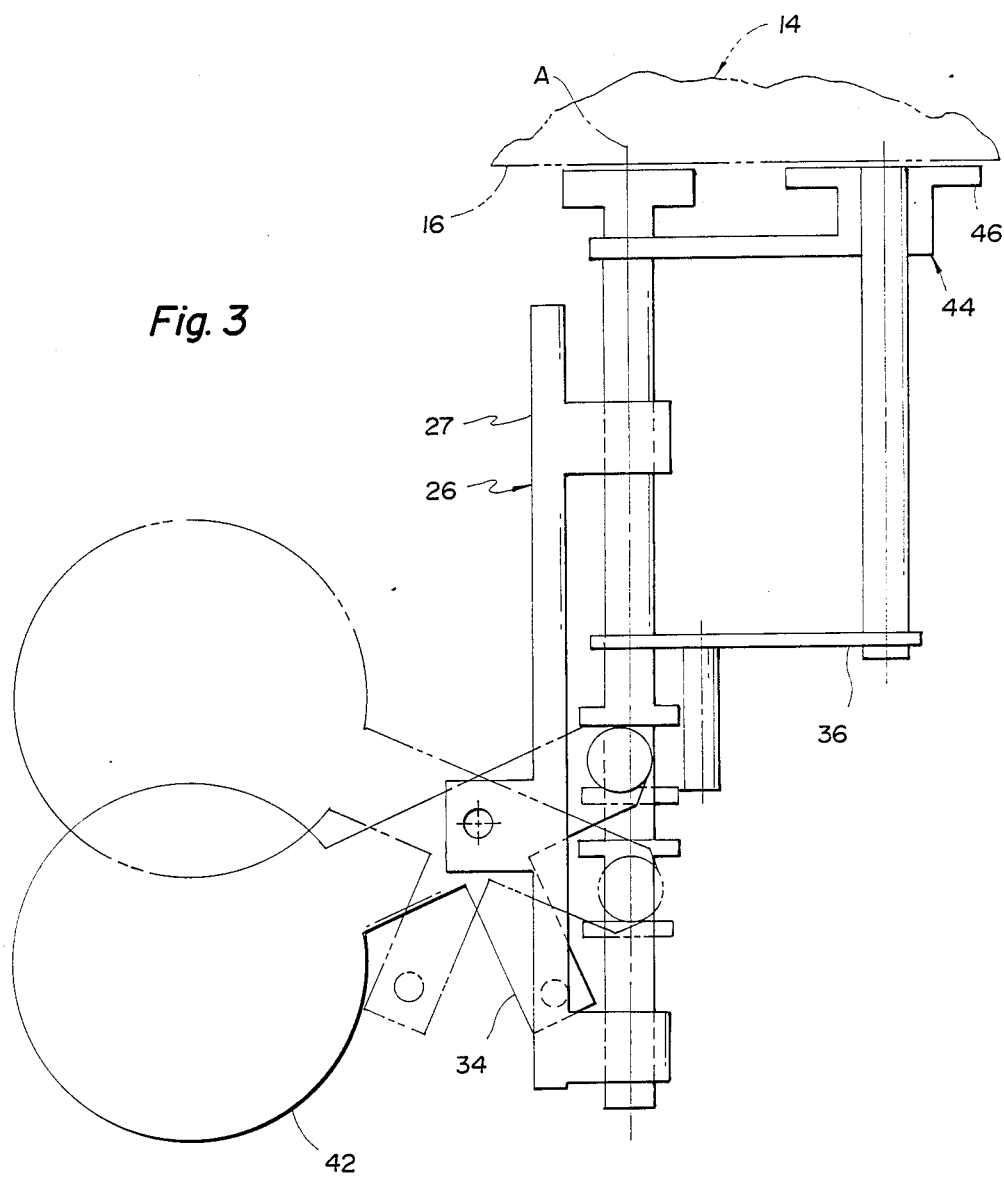
FIG. 3 is a sectional elevational view of the glass sheet locator shown in FIG. 2 illustrating a counterweight assembly.
Figure 5:
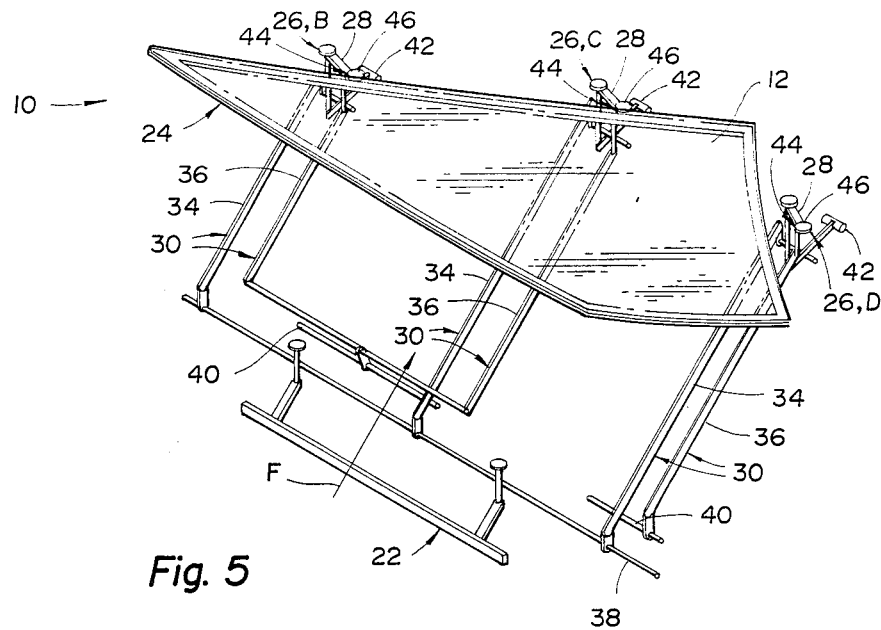
FIG. 5 is a perspective view of the apparatus shown in FIG. 1 and 4 illustrating the glass sheet in contact with two glass sheet locators, the glass sheet being suspended by the topside transfer platen above the mold.

In FIG. 4 two of the glass sheet locators 26, identified as B and C, have been pivoted by movement of connectors 28 actuated by elongated rods 36 and driving member 40 so that the glass engagement elements 44 illustrated as rotatable disks 46 contact the mold 24 in position to receive and locate the downstream periphery of glass sheet 12 with respect to the mold. In FIG. 5 glass sheet 12 is shown in contact with rotatable disks 46 of glass sheet locators 26,A and 26,B and the glass sheet is substantially in position for subsequent deposition onto mold 24.

Figure 6:
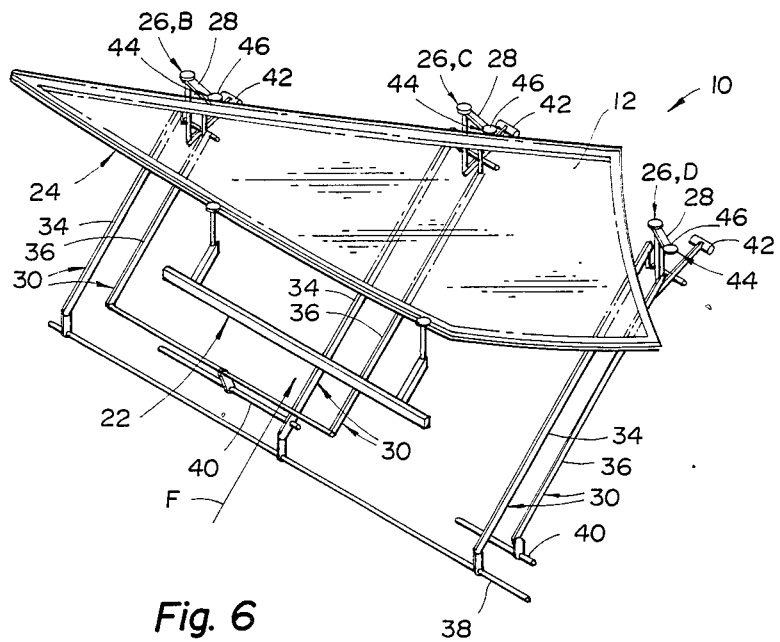
FIG. 6 is a perspective view of the apparatus shown in FIG. 5 illustrating the backgate in contact with the mold and glass sheet to position the glass sheet with respect to the mold in the direction of glass flow.

In FIG. 6, the glass positioning backgate 22 is shown, after having been operated to travel in the direction of glass flow, contacting the mold 24 to position glass sheet 12 in the direction of glass flow F. In the final position of the apparatus 10, shown in FIG. 7, the remaining glass sheet locator 26, identified as D, has been pivoted by movement of connectors 28 actuated by elongated rods 36 and driving member 40 to contact the glass sheet 12 and to thereby position the glass sheet in a direction perpendicular to the direction of glass flow F.

Figure 7:
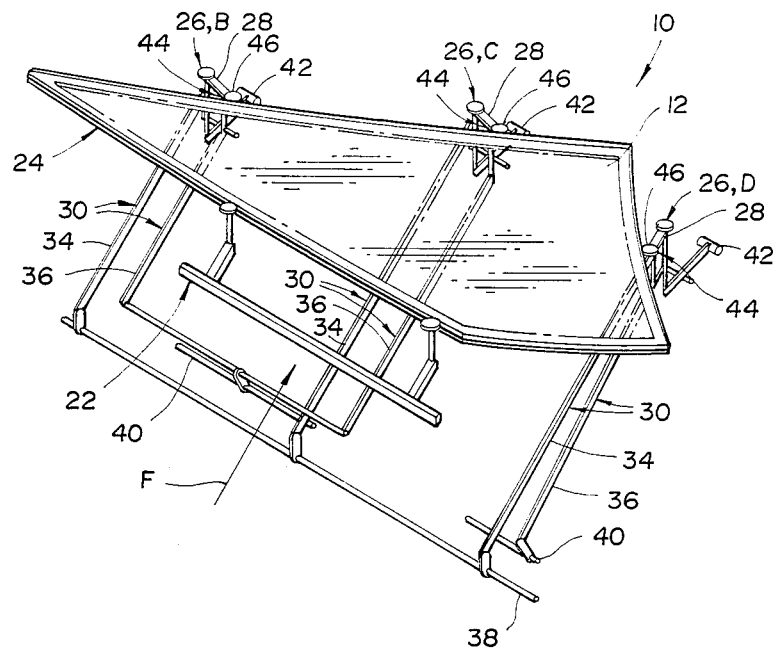
FIG. 7 is a perspective view of the apparatus shown in FIG. 6 illustrating a third glass sheet locator in contact with the glass sheet for positioning the glass sheet with respect to the mold in the direction perpendicular to the direction of glass sheet travel so the glass sheet is positioned to be deposited onto the mold for further processing.

With continued reference to FIG. 7, the cooperation of glass sheet locators 26-B, C and D and backgate 18 have located glass sheet 12 on topside transfer platen 14 above mold 24. Now that glass sheet 12 has been located with precision above the mold 24, the vacuum pressure of the topside transfer platen 14 is removed and the glass drops from the topside transfer platen for accurate registration onto the mold 24 for further processing.

While the best mode for carrying out the invention has been described in detail, those familiar with the art to which this invention relates will recognize various alternative designs and embodiments for practicing the invention as defined by the following claim.

What is claimed is:

1. In a glass sheet forming system including a topside transfer platen having a downwardly facing surface located adjacent to and extending away from a heating conveyor including conveyor rolls and a glass positioning backgate, the transfer platen at an elevation just slightly above the conveyor rolls to receive a heated glass sheet from the heating conveyor, the topside transfer platen being located above a moveable mold having a curved mold surface that is reciprocally positional below the topside transfer platen to receive the heated glass sheet from the topside transfer platen, the improvement comprising: a plurality of glass sheet locators, each including a mount, movably mounted on the mold; each locator including a connector pivotal in a horizontal plane about a pivotal axis extending vertically from the mold; each connector also being vertically movable along its pivotal axis between a raised position above the mold for locating the glass sheet as the glass sheet moves along the topside transfer platen and a lowered position below the curved mold surface; linkages connecting the locators for cooperable operation to position the glass sheet with respect to the mold; and an actuator for moving the linkages to raise the locators above the mold to locate the glass sheet on the topside transfer platen and also being operable with the cooperable operation of the backgate, to operate pivotal movement of the connectors to position the glass sheets for subsequent registration with the curved mold surface whereby the glass sheet can be accurately deposited thereon by the topside transfer platen in preparation for the forming operation.

2. An improvement as in claim 1 wherein said linkages include elongated bars for vertical actuation of the locators and also including elongated rods for actuating pivotal movement of the locators.

3. An improvement as in claim 2 further including a drive shaft for actuating the elongated bars to effect vertical movement of the locators.

4. An improvement as in claim 3 further including a counterweight mounted on each glass sheet locator and being cooperable with the elongated bars to compensate for any over travel of the elongated bars and for limiting vertical movement of the locators.

5. An improvement as in claim 2 further including a driving member for actuating the elongated rods to effect pivotal movement of the locators.

6. An improvement as in claim 1 further including a glass engagement element mounted on the connector for engaging the glass sheet.

7. An improvement as in claim 2 wherein said glass engagement element is rotatably mounted on the connector.

8. An improvement as in claim 3 wherein said glass engagement element is a rotatable disc.

9. In a glass sheet forming system including a topside transfer platen having a downwardly facing surface located adjacent to and extending away from a heating conveyor including conveyor rolls and a glass positioning backgate, the transfer platen at an elevation just slightly above the conveyor rolls to receive a heated glass sheet from the heating conveyor, the topside transfer platen being located above a moveable mold having a curved mold surface that is reciprocally positional below the topside transfer platen to receive the heated glass sheet from the topside transfer platen, the improvement comprising: a plurality of glass sheet locators, each including a mount, movably mounted on the mold; each locator including a connector pivotal in a horizontal plane about a pivotal axis extending vertically from the mold; each connector also being vertically movable along its pivotal axis between a raised position above the mold for locating the glass sheet as the glass sheet moves along the topside transfer platen and a lowered position below the curved mold surface; each locator further including a glass engagement element mounted on the connector thereof for engaging the glass sheet; linkages connecting the locators for cooperable operation to position the glass sheet with respect to the mold; and an actuator for moving the linkages to raise the locators above the mold to locate the glass sheet on the topside transfer platen and also being operable with the cooperable operation of the backgate, to operate pivotal movement of the connectors to position the glass sheets for subsequent registration with the curved mold surface whereby the glass sheet can be accurately deposited thereon by the topside transfer platen in preparation for the forming operation.

10. In a glass sheet forming system including a topside transfer platen having a downwardly facing surface located adjacent to and extending away from a heating conveyor including conveyor rolls and a glass positioning backgate, the transfer platen at an elevation just slightly above the conveyor rolls to receive a heated glass sheet from the heating conveyor, the topside transfer platen being located above a moveable mold having a curved mold surface that is reciprocally positional below the topside transfer platen to receive the heated glass sheet from the topside transfer platen, the improvement comprising: a plurality of glass sheet locators, each including a mount, movably mounted on the mold; each locator including a connector pivotal in a horizontal plane about a pivotal axis extending vertically from the mold; each connector also being vertically movable along its pivotal axis between a raised position above the mold for locating the glass sheet as the glass sheet moves along the topside transfer platen and a lowered position below the curved mold surface; each locator further including a rotatable glass engagement element defining a disc mounted on the connector thereof for engaging the glass sheet; linkages connecting the locators for cooperable operation to position the glass sheet with respect to the mold; said linkages including elongated bars for vertical actuation of the locators and also including elongated rods for actuating pivotal movement of the locators; a drive shaft for actuating the elongated pass to effect the vertical movement of the locators; a driving member for actuating the elongated rods to effect the pivotal movement of the locators; a counterweight mounted on each glass sheet locator and being cooperable with the elongated bars to compensate for any over travel of the elongated bars and for limiting vertical movement of the locators; and an actuator for moving the drive shaft to raise the locators above the mold to locate the glass sheet on the topside transfer platen and also being operable with the cooperable operation of the backgate to actuate the driving member to operate pivotal movement of the connectors to position the glass sheets for subsequent registration with the curved mold surface whereby the glass sheet can be accurately deposited thereon by the topside transfer platen in preparation for the forming operation.

* * * * *